Oct. 26, 1937.  W. ROHN  2,097,344

METALLURGICAL SLAG REACTION

Filed Dec. 5, 1933

Inventor.
WILHELM ROHN.
By Kuna & Rauber
Attorneys

Patented Oct. 26, 1937

2,097,344

UNITED STATES PATENT OFFICE 2,097,344

METALLURGICAL SLAG REACTION

Wilhelm Rohn, Hanau-on-the-Main, Germany, assignor to Heraeus-Vacuumschmelze A. G., Hanau-on-the-Main, Germany, a German company Application December 5, 1933, Serial No. 701,000
In Germany December 6, 1932

3 Claims. (Cl. 75—10)

This application is a continuation in part of my U. S. Patent No. 1,983,242, filed August 15, 1931.

The invention relates to a process for accelerating metallurgical slag reactions in inductively heated electric melting furnaces.

The increasing introduction of inductively heated electric metallurgical melting furnaces has shown that the motion in the bath occurring in such melting furnaces has a strong accelerating and assisting action on a number of known metallurgical processes including, inter alia, the reduction of the carbon, sulphur and phosphorus content. This knowledge has assisted materially in the increasing introduction into metallurgical practice of the so-called high frequency furnaces.

Figure 1:
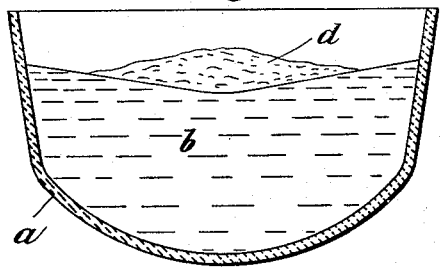
Figure 2:
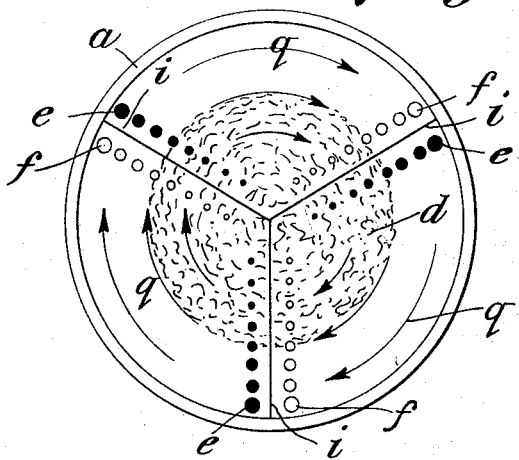
Figure 3:
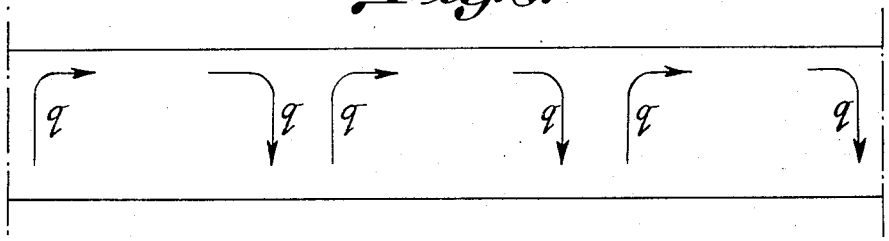
Figure 4:
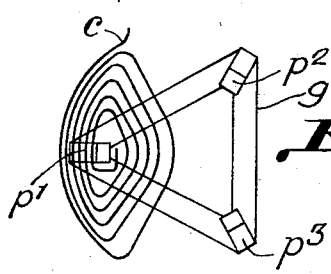
Figure 6:
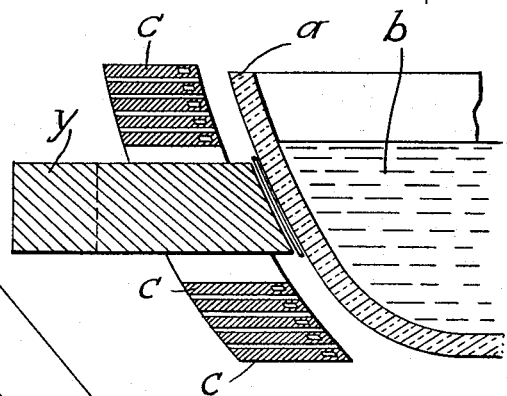
Figure 5:
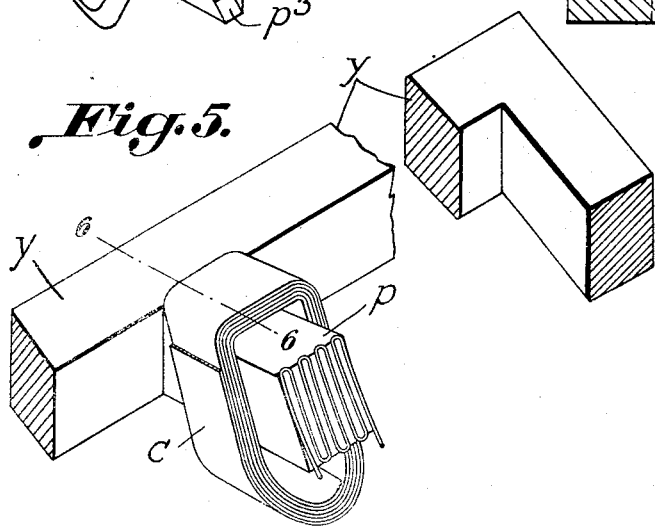

In the accompanying drawing, Fig. 1 is a vertical section illustrating one feature of the present invention; Fig. 2 is a plan view of the same with markings thereon further illustrating the same; Fig. 3 is a panorama view of the same; Fig. 4 illustrates diagrammatically one feature of the electric furnace utilized in the practice of the present invention; Fig. 5 is a perspective view of another feature; and Fig. 6 is a sectional view along plane 6—6 of Fig. 5.

Referring to the drawing, in all figures $a$ is the hearth, $b$ is the molten metal bath, $c$—$c$ are the induction coils for energizing the bath, $y$ is the yoke and $p$ is the magnetic pole piece. Arrows $q$ indicate the circulatory motions imparted to the bath by reason of the specific furnace construction and $d$ indicates the slag with which it is desired to react the bath $b$ in accordance with the present invention.

In a high frequency furnace known per se the molten metal rises in the centre of the furnace, flows outwardly towards the periphery and there flows downwardly and laminarily along the lining. The slag provided on the surface of the bath for exerting metallurgical reactions is accordingly driven to the edge of the fused metal and collects for the greater part at the lining of the furnace. Insofar as the slag is able to react with the lining this collection of the slag leads to a comparatively rapid erosion of the lining at the points at which the slag comes into contact therewith.

In itself it would be desirable to make provision for the slag to be held as far as possible away from the walls of the furnace, i. e. from the lining; further it would be desirable to make the motion in the bath, which in the induction furnaces hitherto known is essentially laminar, so violent and so turbulent that the bath does not merely move continuously past the slag lying quietly on its surface but that the slag is stirred into the bath as an emulsion.

The features which are indicated above as being desirable are attained if the axes of the induction coils are not arranged vertically and concentrically with respect to the bath as hitherto customary in high frequency furnaces but are disposed primarily radially and horizontally. A further improvement is attained if the metallurgical melting furnace heated by induction is supplied not with single or two phase alternating current but with three-phase current. The mode of operation of such arrangements is indicated in Figs. 1, 2 and 3.

In Fig. 1 the induction coils $c$, $c$ which are diagrammatically shown in Fig. 4 have nearly horizontally and radially directed axes. In consequence of the action of the rotating field the entire bath is caused to rotate about a vertical axis. This has the effect that the bath is at a higher level at the periphery than at the centre so that in consequence the slag $d$ present on the surface of the bath collects primarily at the centre of the bath and thus is kept from a too intimate contact with the lining.

In Fig. 2, which again shows a plain view of the surface of the bath in a furnace according to the invention, the points at which the bath moves upwardly from below are shown by solid circles $e$ whereas the points at which the bath flows downwardly are indicated by open circles $f$. This illustration is based on a furnace with three poles. In Fig. 4, which is drawn on a smaller scale than Figs. 1 and 2, $g$ is a triangular yoke $y$ with the three poles $p'$, $p^2$, $p^3$, these elements of the furnace not being shown in Figs. 1 and 2. It is seen that in consequence of the arrangement of the induction coils, $c$, with nearly horizontal radial axes there are rising and falling motions directly adjacent one another in the horizontally rotating bath about a plurality of horizontal axes equal to the number of coils $c$, which gives rise to a strong turbulence of the horizontally rotating flow of the bath and in consequence the bath does not merely flow beneath the slag but tears the slag directly into small particles and stirs them into the bath as an emulsion. The result of this is an extremely great acceleration of all metallurgical reactions with a consequent relatively short reaction time period. The degree of turbulence necessary in the bath to obtain emulsification of the slag in the bath and the desired reaction temperatures in the bath may be gained through the proper control and regulation over the coil windings and current input substantially as described in my Patent No. 1,983,242.

The panorama view of Fig. 3 is shown on a somewhat smaller scale than Fig. 2 and the motions in the bath are again indicated by arrows $q$.

The idea of furnishing induction furnaces with coils the axes of which are arranged radially and predominately horizontally is not novel. When in spite of this the above described phenomena and motions in the bath have not hitherto been disclosed and utilized, this may perhaps be attributed principally to the fact that such furnaces although proposed on paper many times have not yet been utilized in practical operation at all. The study of the phenomena referred to in a three-pole three phase furnace constructed as described and claimed in my prior Patent 1,983,242, Figs. 7 and 8 of the drawings of said patent being reproduced as Figs. 5 and 6 of the present application, containing about 1600 kilos has shown that the difference in level between the centre of the bath and the edge of the bath can amount to 10 to 12 cm. and has the effect that the slag accumulates principally in the centre of the bath. Along the three lines $i$ in Fig. 2, at which upwardly directed and downwardly directed motions are immediately adjacent one another in the bath there are differences in level of from 4 to 6 cm. so that at these points there is the appearance of a standing breaker. Quantities of slag of from 80 to 100 kilos are in this way drawn under the surface of the bath so that the entire surface of the bath exhibits a metallic appearance and there are no accumulations of slag on the surface at all. The extremely violent motion of the bath, the intensity of which has not been attained in any induction furnace hitherto constructed, renders it possible to reduce the carbon content of a charge of 1600 kilos from 1.0 to 0.02% of carbon within 30 to 50 minutes in the furnace described, or to reduce the phosphorus content from 0.15 to 0.003% or to reduce the sulphur content from 0.1 to 0.003%, within the same time.

In the example above given the charge mentioned may be comprised of pig iron or other impure iron alloy and the reacting slag may include the usual composition of basic and oxidizing constituents heretofore used in the art to form a basic oxidizing slag.

The furnace structure illustrated in Figs. 5 and 6 being fully described in my above identified patent need not be further described herein beyond identifying the various elements thereof to conform with the above description of the present invention.

From the above description it is apparent that many modifications and adaptions may be made therein without departing essentially from the nature and scope as may be included within the following claims:

I claim:

1. The method of purifying molten metal baths with a reacting slag which comprises emulsifying the slag within the molten metal by rotatively stirring the bath about a plurality of radial axes lying in substantially horizontal planes as well as rotatively stirring the bath horizontally about a center vertical axis by means of induced electric currents.

2. In the method of claim 1, regulating the intensity of said currents to maintain the desired reacting temperature in the bath and the desired degree of emulsification of the slag in the molten metal.

3. The method of claim 1 in which the molten metal bath is comprised of pig iron and the reacting slag is an oxidizing slag adapted to remove carbon, phosphorus and sulfur from the said pig iron.

WILHELM ROHN.